United States Patent
Syamoto (10) Patent No.: US 7,219,572 B2
(45) Date of Patent: May 22, 2007

(54) SHIFT DEVICE

(75) Inventor: Noriyasu Syamoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 369 days.

(21) Appl. No.: 10/438,601

(22) Filed: May 15, 2003

(65) Prior Publication Data
US 2003/0213327 A1   Nov. 20, 2003

(30) Foreign Application Priority Data
May 15, 2002   (JP) ............................. 2002-140007

(51) Int. Cl.
*F16H 59/10*   (2006.01)
(52) U.S. Cl. .................. 74/473.33; 74/335; 74/473.12; 74/473.18
(58) Field of Classification Search ............. 74/473.12, 74/473.18, 473.33, 471 XY, 335
See application file for complete search history.

(56) References Cited
U.S. PATENT DOCUMENTS
3,768,328 A * 10/1973 Campbell .............. 74/471 XY

| | | | |
|---|---|---|---|
| 4,519,266 A | 5/1985 | Reinecke | |
| 5,005,411 A * | 4/1991 | Miyagi et al. ........... | 74/473.15 |
| 5,179,867 A | 1/1993 | Sakakibara et al. | |
| 5,706,702 A * | 1/1998 | Yamada ................... | 74/473.15 |
| 5,934,146 A * | 8/1999 | Richard ................... | 74/473.33 |
| 6,415,677 B1 * | 7/2002 | Skogward ................ | 74/473.12 |
| 6,948,582 B2 * | 9/2005 | Shiomi et al. ............. | 180/315 |

FOREIGN PATENT DOCUMENTS

| DE | 298 18 367 | * 3/2000 |
|---|---|---|
| JP | 04-123821 | 11/1992 |
| JP | 2001-105920 | 8/1995 |
| JP | 2000-108707 | 4/2000 |

* cited by examiner

*Primary Examiner*—William C. Joyce
(74) *Attorney, Agent, or Firm*—Patterson, Thuente, Skaar & Christensen, P.A.

(57) ABSTRACT

A compact shift device for shifting gears of a vehicle transmission. The shift device includes a shift lever movable in a first direction and a second direction to shift the gears of the transmission. The first direction is perpendicular to the second direction. A first movable member is connected to the shift lever to move in cooperation with the shift lever for detecting the position of the shift lever in the first direction. A second movable member is connected to the shift lever to move in cooperation with the shift lever for detecting the position of the shift lever in the second direction. The first and second movable members move along the same plane.

5 Claims, 5 Drawing Sheets

SHIFT DEVICE

BACKGROUND OF THE INVENTION

The present invention relates to a shift-by-wire type shift device.

In a prior art automobile, in which an automatic transmission is installed, the gear position of an automatic transmission is determined by moving a shift lever of a shift device. A shift-by-wire type shift device has been developed in these recent years. The shift-by-wire type shift device detects the position of a shift member, such as a shift lever, with a sensor and converts the detected signal into an electric shifting signal, which activates an actuator for switching the connected gear of the transmission in accordance with the shifting signal. The shift-by-wire type shift device does not require a mechanical structure, such as a link mechanism. This facilitates manufacturing of a more compact shift device. Further, the shifting of gears is performed with a relatively small force and the shift device is laid out with more freedom in the passenger compartment.

However, in the prior art shift-by-wire type shift device, sensors, which detect the position of the shift lever, are arranged at positions corresponding to each position of the shift lever. Therefore, space is required at each shift lever position for the corresponding sensor. Thus, it is difficult to reduce the size of the shift device.

SUMMARY OF THE INVENTION

The present invention is a shift device for shifting gears of a vehicle transmission. The shift device includes a shift lever movable in a first direction and a second direction to shift the gears of the transmission. The first direction is perpendicular to the second direction. A first movable member is connected to the shift lever to move in cooperation with the shift lever for detecting the position of the shift lever in the first direction. A second movable member is connected to the shift lever to move in cooperation with the shift lever for detecting the position of the shift lever in the second direction. The first and second movable members move along the same plane.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 1:
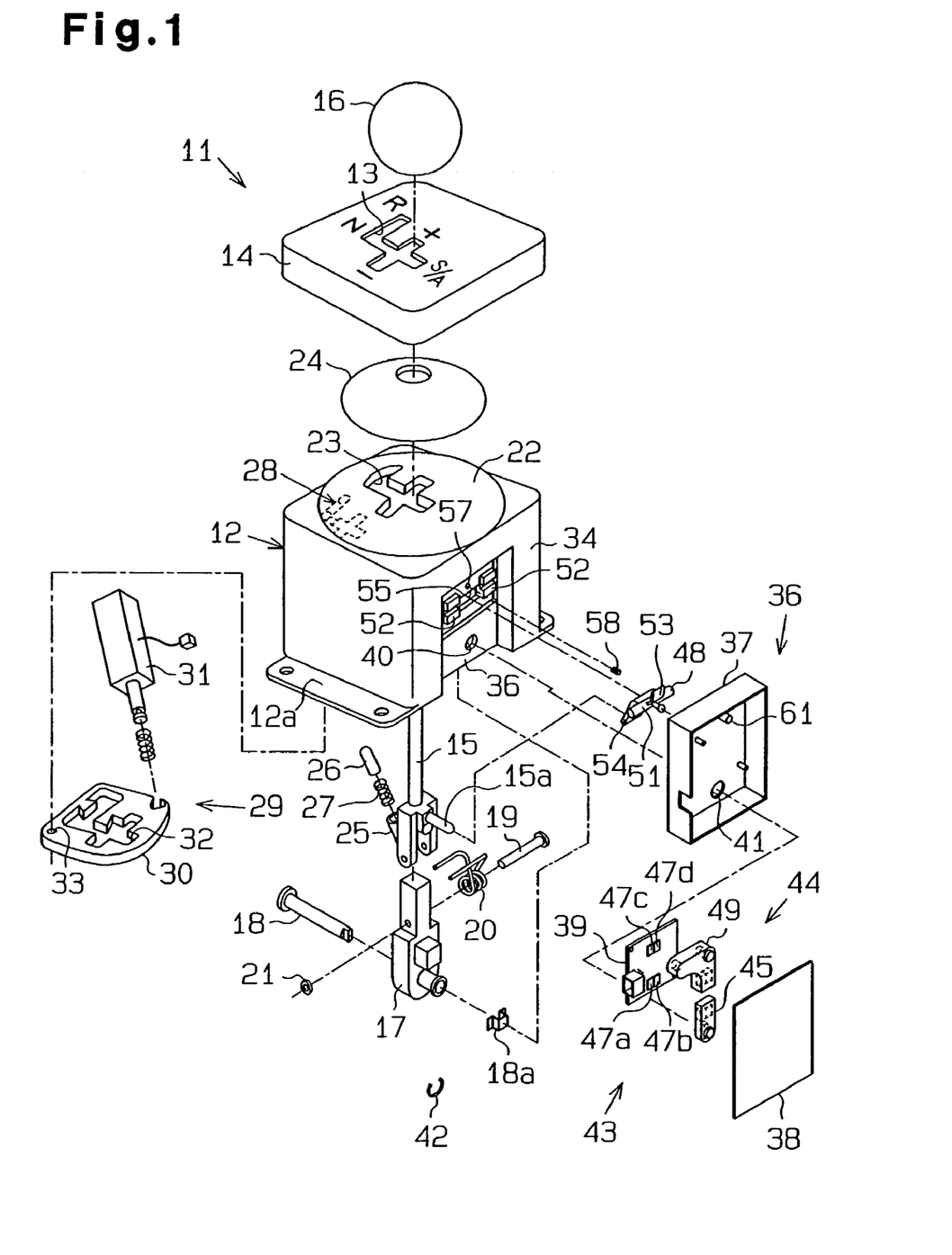
FIG. 1 is a schematic exploded perspective view of a shift device according to a preferred embodiment of the present invention.
Figure 2:
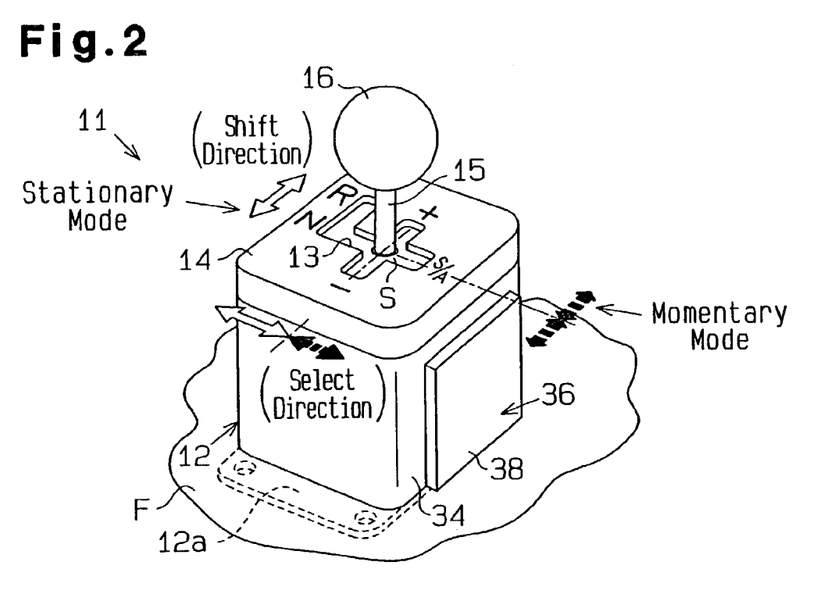
FIG. 2 is a schematic perspective view of the shift device.

FIG. 1 is an exploded perspective view schematically showing a shift device 11 according to a preferred embodiment of the present invention. FIG. 2 is an exploded perspective view schematically showing the shift device 11.

Referring to FIGS. 1 and 2, the shift device 11 includes a housing 12. The housing 12 is fastened to a floor console F of a vehicle by means of a flange 12a, which is provided on one end of the housing 12. A cover plate 14, which includes a shift gate 13, covers the top of the housing 12. A shift lever 15 projects from the shift gate 13 and a spherical knob 16 is attached to the upper end of the shift lever 15.

The shift gate 13 includes a cross-like portion, which extends toward the front and the rear and toward the right and left of the vehicle, and a forward extending portion, which extends toward the front of the vehicle from the left end of the cross-like portion. When the shift lever 15 is moved to the left front end of the shift gate 13 (position R), the transmission of the vehicle enters a state in which the reverse gear is connected. When the shift lever 15 is moved to the left end of the cross (position N), the transmission enters a neutral state. Further, when the shift lever 15 is moved to the center of the cross (position S), the transmission enters a sequential state.

When the shift lever 15 is moved to the front end of the cross-like portion (position +) in the sequential state, the transmission shifts to one higher gear. From this state, when a driver releases the knob 16, the shift lever 15 returns to position.

When the shift lever 15 is moved to the rear end of the cross-like portion (position −) in the sequential state, the transmission shifts to one lower gear. Then, the shift lever 15 returns again to position S. Further, when the shift lever 15 is moved to the right end of the cross-like portion (position S/A), the transmission enters an automatic state (i.e., automatic transmission state). The shift lever 15 remains in the automatic state even though the shift lever 15 returns to position S. When the shift lever 15 is moved to position S/A in the automatic state, the transmission enters the sequential state.

Referring to FIG. 2, the shift device 11 has a stationary operation mode (as indicated by the white arrow), in which the shift lever 15 remains at its selected position when the force applied to the shift lever 15 is released (i.e., when the knob 16 is released); The shift device 11 also has a momentary operation mode (as indicated by the black arrow) that returns the shift lever 15 to the reference position S when the knob 16 is released. In the preferred embodiment, the stationary operation mode is entered when the shift lever 15 is moved to positions R, N, and S, and the momentary operation mode is entered when the shift lever 15 is moved to positions +, −, and S/A. Each of the characters R, N, +, −, and S/A are marked on the cover plate 14 at locations corresponding to shift lever positions R, N, +, −, and S/A, respectively.

In the preferred embodiment, the direction in which the shift lever 15 moves between position R and position N is referred to as a first direction, or a shift direction. The direction in which the shift lever 15 moves between position + and position − is also referred to as the shift direction. The direction in which the shift lever 15 moves between position N and position S/A is referred to as a second direction, which is referred to as a select direction. The shift direction and the select direction are perpendicular to each other.

Referring to FIG. 1, the housing 12 includes a retainer 17 and a shaft 18, which extends through the lower portion of the retainer 17. The proximal end of the shaft 18 is pivotally supported by a supporter (not shown), which is arranged in the housing 12. The retainer 17 pivots integrally with the shaft 18 toward the front and rear of the vehicle (i.e., in the shift direction). The upper portion of the retainer 17 is pivotally attached to a generally U-shaped lower portion of the shift lever 15 by a select pin 19. The select pin 19, which extends through a torsion spring 20, the lower portion of the shift lever 15, and the upper portion of the retainer 17, is fastened by a nut 21. Accordingly, the shift lever 15 is pivotal relative to the retainer 17 toward the front and rear of the vehicle (i.e., in the select direction) and toward the right and left of the vehicle (i.e., in the shift direction). The torsion spring 20 urges the shift lever 15 back to position S from position S/A.

The housing 12 has a dome 22 on its top, which includes a gate 23 that is substantially identical to the shift gate 13 of the cover plate 14. A dome-like slide cover 24 is placed over the dome 22. A through hole for the shift lever 15 extends through the center of the slide cover 24. The slide cover 24 covers the gate 23 and moves along the dome 22 in cooperation with the shift lever 15. The shift lever 15 extends through the gate 23, the though hole of the slide cover 24, and the shift gate 13 of the cover plate 14.

A pin holder 25 extending diagonally upward is arranged at the lower portion of the shift lever 15. The pin holder 25 includes a detent pin 26 and a spring 27, which urges the detent pin 26 to protrude from the pin holder 25. The detent pin 26 engages a detent socket 28, which is arranged at the lower surface of the dome 22. The detent socket 28 is substantially identical to the shift gate 13.

A shift lock device 29 is attached to the lower side of the dome 22 in the housing 12. The shift lock device 29 includes a stopper plate 30 and a solenoid 31. The stopper plate 30 includes a stopper gate 32, which has a predetermined shape and through which the shift lever 15 extends. The stopper plate 30 has a hole 33, through which a shaft (not shown) extends. The stopper plate 30 is supported by the solenoid 31 so as to be pivotal about the shaft that extends through the hole 33. When the engine of the vehicle is started, the shift lock device 29 activates the solenoid 31 to unlock the shift lever 15. When the engine is stopped, the shift lock device 29 deactivates the solenoid 31 to lock the shift lever 15.

Figure 3:
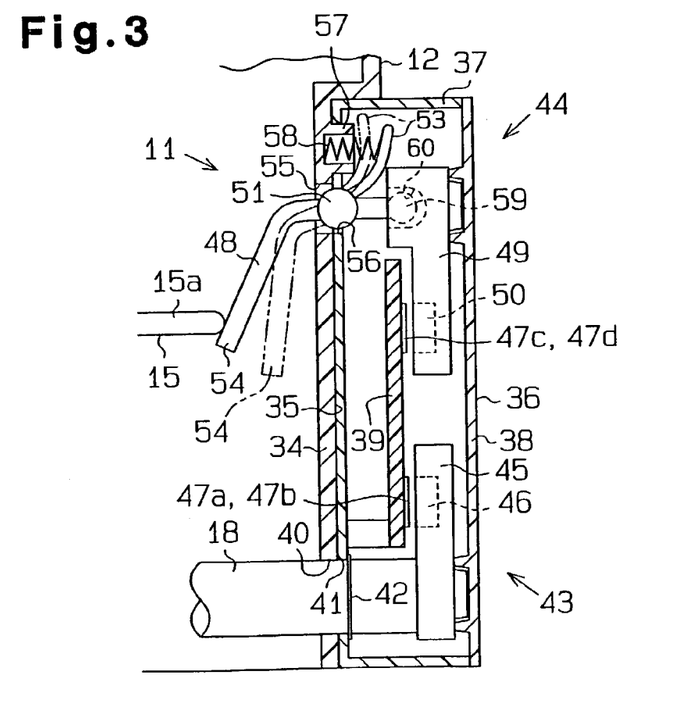
FIG. 3 is a schematic cross-sectional view of a sensor unit.
Figure 4:
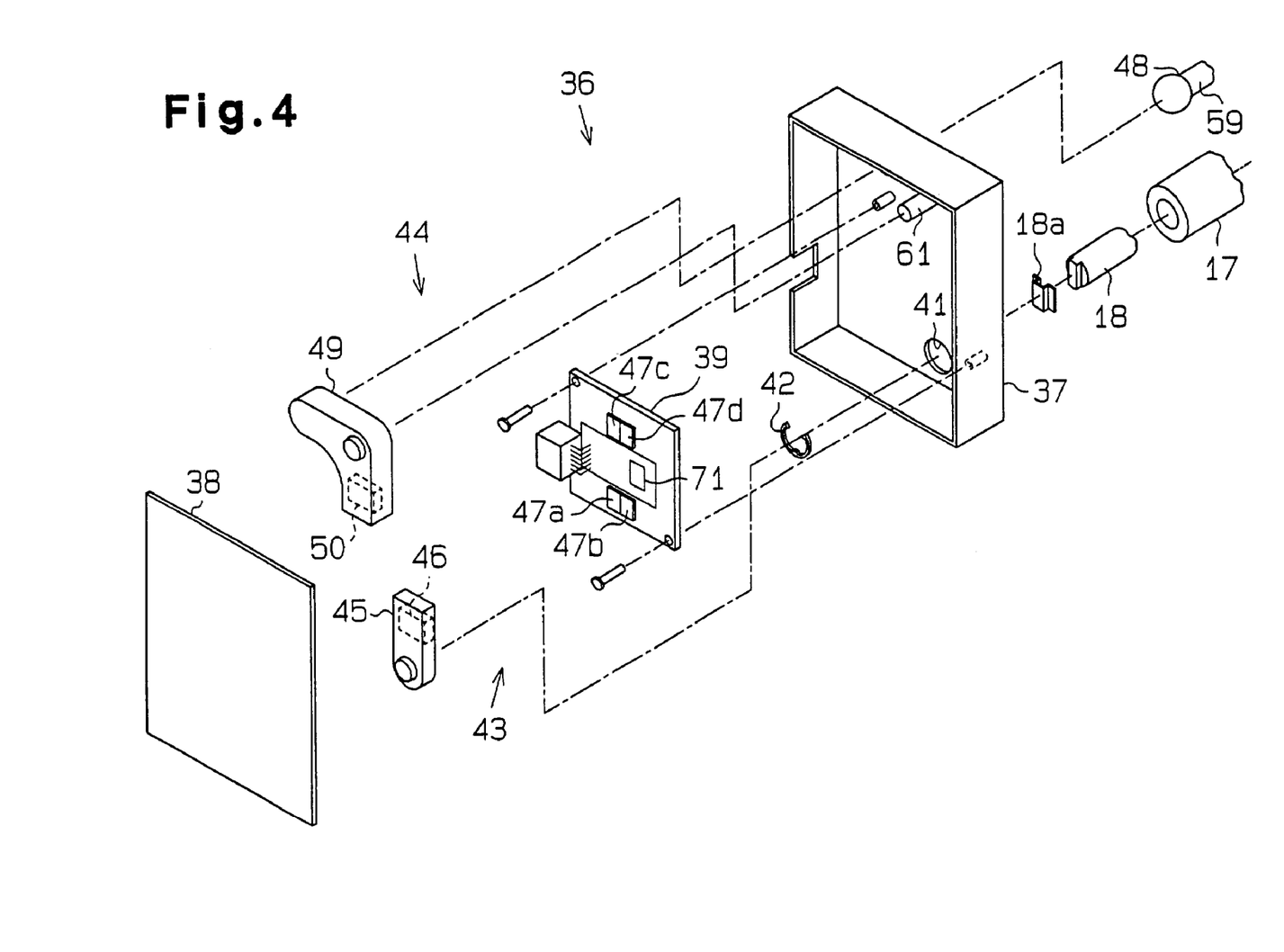
FIG. 4 is a schematic exploded perspective view of the sensor unit.

Referring to FIGS. 1 and 3, the shaft 18 extends through a sidewall 34 of the housing 12. A hollow portion 35 is defined in the sidewall 34. A sensor unit 36 is received in the hollow portion 35. As shown in FIGS. 1, 3, and 4, the sensor unit 36 includes a flat box-like case 37, which has a closed bottom, and a cover plate 38, which covers the top of the case 37. Part of the case 37 is arranged in the hollow portion 35. A printed board 39, which is smaller than the case 37, is fixed in the case 37.

The shaft 18 is inserted through a hole 40 extending through the sidewall 34 of the housing 12 and a hole 41 extending through the case 37. The distal end of the shaft 18 is located in the sensor unit 36 at a position closer to the cover plate 38 than the printed board 39. The shaft 18 is fixed by a snap ring 42.

Referring to FIGS. 3 and 4, a first sensor mechanism 43 and a second sensor mechanism 44 are arranged in the case 37 close to each other. The first sensor mechanism 43 includes a first pivot plate 45, which functions as a first movable member, a magnet 46, a first MRE (magnetic resistor) element 47a, which functions as a first sensor, and a second MRE element 47b, which also functions as a first sensor. When the shift lever 15 is moved in the shift direction, the first pivot plate 45 is pivoted in the same direction in cooperation with the shift lever 15. The first pivot plate 45, which includes a magnet 46, is attached to the distal end of the shaft 18 by a guide plate 18a. The first pivot plate 45 and the magnet 46 pivot integrally with the shaft 18.

Figure 5:
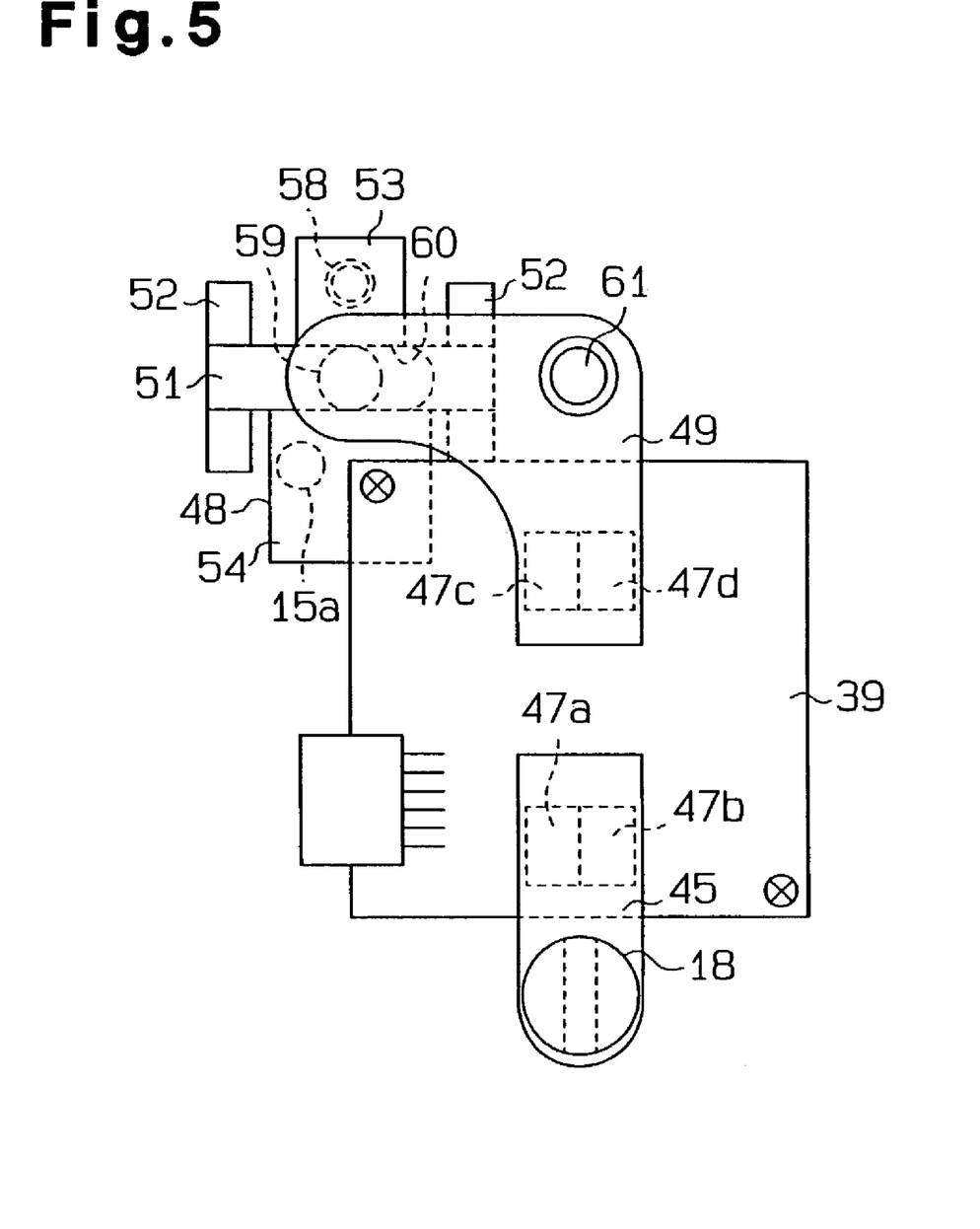
FIG. 5 is a schematic view showing the position of an cooperative member, a first pivot plate and a second pivot plate.

Referring to FIGS. 3 and 5, the first MRE element 47a and the second MRE element 47b are non-contact sensors and are connected to the printed board 39 separately from each other at positions opposing the magnet 46. The first and second MRE elements 47a and 47b are arranged in parallel with each other with the first MRE element 47a arranged toward the rear of the vehicle and the second MRE element 47b arranged toward the front of the vehicle. The first and second MRE elements 47a and 47b detect changes in the magnetic flux of the magnet 46, which pivots integrally with the first pivot plate 45.

Figure 6A:
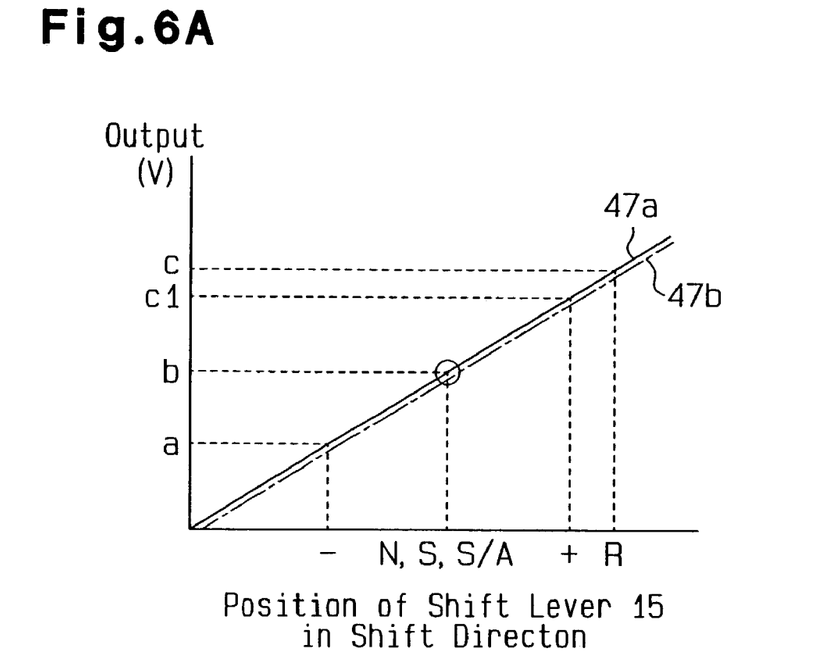
FIG. 6A is a graph showing a first output signal.

The first and second MRE elements 47a and 47b detect changes in the magnetic flux of the magnet 46 to generate four kinds of analog signals. As shown in FIG. 6A, when the shift lever 15 is moved to position R, the first and second MRE elements 47a and 47b generate a first output signal (a first detection signal) having potential c (V). When the shift lever 15 is moved to position +, the first and second MRE elements 47a and 47b generate a first output signal having potential c1 (V). When the shift lever is moved to any one of positions N, S, and S/A, the first and the second MRE elements 47a and 47b generate a first output signal having potential b (V). When the shift lever 15 is moved to position −, the first and second MRE elements 47a and 47b generate a first output signal having potential a (V).

Referring to FIG. 1 and FIGS. 3 to 5, the second sensor mechanism 44 includes a cooperative member 48, a second pivot plate 49, which functions as a second movable member, a magnet 50, a third MRE element 47c, which functions as a second sensor, and a fourth MRE element 47d, which also functions as a second sensor.

The cooperative member 48 has a pivot shaft 51. The two ends of the pivot shaft 51 are fitted into two fitting portions 52, which are arranged in the hollow portion 35, so that the cooperative member 48 is pivotal about the pivot shaft 51. The cooperative member 48 includes an urging plate 53, which extends from the peripheral surface of the pivot shaft 51, and an engaging plate 54, which extends from the pivot shaft 51 in the substantially opposite direction of the urging plate 53. As shown in FIG. 3, the urging plate 53 and the engaging plate 54 are curved. The cooperative member 48 extends through openings 55 and 56, which extends respectively through the sidewall 34 of the housing 12 and the case 37.

The urging plate 53 is arranged in the case 37, and the engaging plate 54 is arranged in the housing 12. The urging plate 53 is pressed by a spring 58, which is retained in a spring retainer 57 of the hollow portion 35. When the shift lever 15 is moved in the select direction, a projection 15a extending from the shift lever 15 pushes the engaging plate 54, which is wider than the urging plate 53. The width of the engaging plate 54 is such that the projection 15a pushes the engaging plate 54 when the shift lever 15 is moved in any shift direction.

A joint 59 projects from the pivot shaft 51 at the opposite side of the engaging plate 54. The joint 59 pivots the second pivot plate 49 in cooperation with the cooperative member 48 when the shift lever 15 is moved in the select direction.

Referring to FIGS. 3 to 5, the second pivot plate 49 includes an elongated groove 60. The distal end of the joint 59 moves back and forth in cooperation with the pivoting of the cooperative member 48 in the elongated groove 60. That is, when the shift lever 15 is moved in the select direction, the second pivot plate 49 is pivoted in the shift direction in cooperation with the shift lever 15 and the cooperative member 48. The second pivot plate 49, which includes the magnet 50, is pivotally supported by a shaft 61 in the case 37. The second pivot plate 49 and the magnet 50 are pivoted integrally with each other. The second pivot plate 49 and the first pivot plate 45 lie along the same plane. However, if necessary, the first and second pivot plates 45 and 49 may be arranged along parallel planes.

The third MRE element 47c and the fourth MRE element 47d are non-contact sensors and are connected to the printed board 39 separately from each other at positions opposing the magnet 50. The third and fourth MRE elements 47c and 47d are arranged in parallel with each other with the third MRE element 47c arranged toward the rear of the vehicle and the fourth MRE element 47d arranged toward the front of the vehicle. The third and fourth MRE elements 47c and 47d each detect changes in the magnetic flux of the magnet 50 when the cooperative member 48 pivots the second pivot plate 49.

Figure 6B:
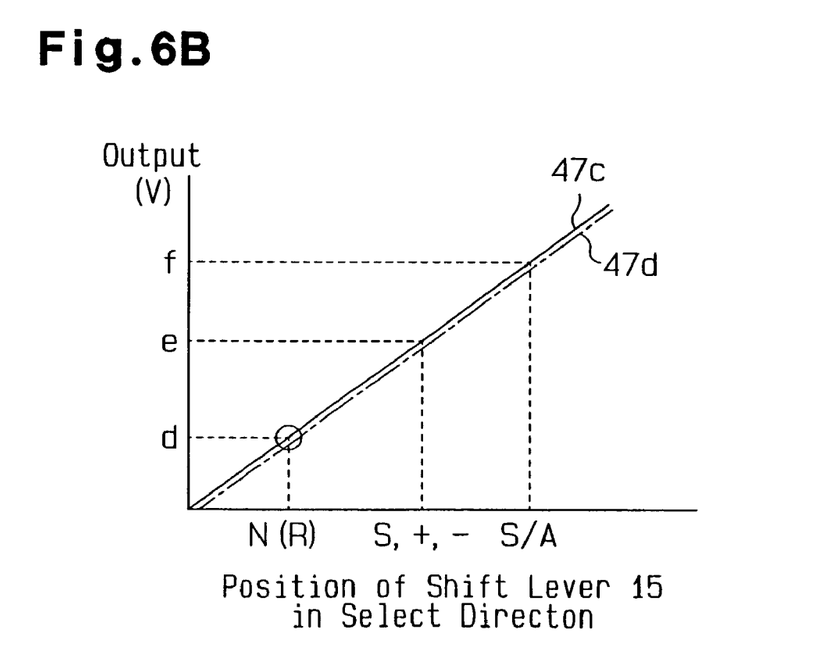
FIG. 6B is a graph showing a second output signal.

The third and fourth MRE elements 47c and 47d detect changes in the magnetic flux of the magnet 50 and output three kinds of analog signals. As shown in FIG. 6B, when the shift lever 15 is moved to position N or position R, the third and fourth MRE elements 47c and 47d generate a second output signal (second detection signal) having potential d (V). When the shift lever 15 is moved to any one of positions S, +, and −, the third and fourth MRE elements 47c and 47d generate the second output signal having potential e (V). When the shift lever 15 is moved to position S/A, the third and fourth MRE elements 47c and 47d generate the second output signal having potential f (V). The magnet 50 and the third and fourth MRE elements 47c and 47d detect the position of the shift lever 15 in the select direction.

The first output signal from the first and second MRE elements 47a and 47b and the second output signal from the third and fourth MRE elements 47c and 47d are processed by an AND circuit (operation circuit) 71. The processing result of the AND circuit 71 is provided to an electronic control unit (ECU) to shift and control the connected gear of a transmission. The ECU detects the position of the shift lever 15 in the shift direction and the select direction from the first and second output signals and provides an actuator, which shifts the gears of the vehicle transmission, with a predetermined operation signal in accordance with the detected position of the shift lever 15. From the first output signal and the second output signal, which may be converted to digital signals corresponding to the position of the shift lever 15, a plurality of AND circuits 71, for example, may generate signals that define a predetermined pattern in correspondence with each position of the shift lever 15. In this case, the ECU may recognize the position of the shift lever 15 from the pattern of the signals.

When the shift lever 15 is moved to position R or position +, the position of the shift lever 15 is determined in accordance with only the second output signal having potential d (V) or potential e (V). That is, position R and position + are determined by detecting the position of the shift lever 15 in the select direction.

The operation of the shift device 11 will now be described. When the shift lever 15 is located at position R and the engine is stopped, the solenoid 31 is inactivated and the shift lever 15 is locked at position R by the stopper plate 30. From this state, when the engine is started, the solenoid 31 is activated and the stopper plate 30 is pivoted to unlock the shift lever 15. The first and second MRE elements 47a and 47b detect the magnetic flux of the magnet 46 and generate the first output signal. The third and fourth MRE elements 47c and 47d detect the magnetic flux of the magnet 50 and generate the second output signal.

When the driver moves the shift lever 15 to position N with the knob 16, the first and second MRE elements 47a and 47b detect the magnetic flux of the magnet 46, which pivots integrally with the shift lever 15 and the first pivot plate 45, and generate the first output signal having potential b (V). Further, the third and fourth MRE elements 47c and 47d detect the magnetic flux of the magnet 50, which rotates integrally with the second pivot plate 49, and generate the second output signal having potential d (V). The first and second output signals are processed by the AND circuit 71 and provided to the ECU (not shown). The ECU generates a predetermined operation signal to activate an actuator in accordance with the operation signal so that the transmission of the vehicle enters a neutral state.

Subsequently, if the driver moves the shift lever 15 to position S, the joint 59 of the cooperative member 48 pivots the second pivot plate 49 when the projection 15a of the shift lever 15 pushes the engaging plate 54 of the cooperative member 48. In this case, the first output signal from the first and second MRE elements 47a and 47b having potential b (V) and the second output signal from the third and fourth MRE elements 47c and 47d having potential e (V) are processed by the AND circuit 71 and provided to the ECU. As a result, the vehicle transmission enters a sequential state.

When the driver moves the shift lever 15 from position S to position +, the first and second MRE elements 47a and 47b generate the first output signal having potential c1 (V), and the third and fourth MRE elements 47c and 47d generate the second output signal having potential e (V). In this case, the ECU actuates the actuator in accordance with the first and second output signals. This shifts the vehicle transmission to one higher gear. When the driver releases the knob 16 in this state, the urging force of the spring 27, which acts on the detent pin 26, returns the shift lever 15 to position S. When the shift lever 15 is moved again from position S to position +, the transmission shifts further to one higher gear.

When the driver shifts the shift lever 15 from position S to position −, the first and second MRE elements 47a and 47b generate the first output signal having potential a (V), and the third and fourth MRE elements 47c and 47d generate the second output signal having potential e (V). This shifts the transmission of the vehicle to one lower gear in accordance with the first and second output signals. When the driver releases the knob 16 in this state, the urging force of the spring 27 returns the shift lever 15 to position S. In the sequential state, the connected gear of the transmission is manually shifted.

When the driver moves the shift lever 15 from position S to position S/A, the projection 15a of the shift lever 15 pushes the engaging plate 54 of the cooperative member 48. Then, the joint 59 of the cooperative member 48 pivots the second pivot plate 49. In this case, the first output signal from the first and second MRE elements 47a and 47b having potential b (V) and the second output signal from the third and fourth MRE elements 47c and 47d having potential f (V) are processed by the AND circuit 71. As a result, the transmission shifts enters the automatic state from the sequential state. When the driver releases the knob 16 in this state, the urging force of the spring 27 and the torsion spring 20 return the shift lever 15 to position S. The connection state of the transmission in the automatic state is automatically changed by known control method based on a vehicle velocity and a throttle opening degree.

When the driver moves the shift lever 15 from position S to position S/A again in the automatic state, the transmission shifts returns to the sequential state from the automatic state. In this manner, whenever the driver moves the shift lever 15 from position S to position S/A, the transmission alternately enters the sequential state and the automatic state. If the driver moves the shift lever 15 to position + or position − when the transmission is in the automatic state, the ECU determines the first output signal from the first and second MRE elements 47a and 47b to be invalid.

If a driver moves the shift lever 15 from position S to position N when the transmission is in the sequential state or the automatic state, the projection 15a of the shift lever 15 stops pushing the engaging plate 54 of the cooperative member 48 and the second pivot plate 49 returns to where it was located before being pivoted. In this state, the first output signal from the first and second MRE elements 47a and 47b having potential b (V) and the second output signal from the third and fourth MRE elements 47c and 47d having potential d (V) are processed in the AND circuit 71. As a result, the transmission enters the neutral state. Subsequently, when the driver moves the shift lever 1 from position N to position R, the first output signal from the first and second MRE elements 47a and 47b having potential c (V) and the second output signal from the third and fourth MRE elements 47c and 47d having potential d (V) are processed by the AND circuit 71. As a result, the rear gear of the transmission is connected.

The ECU determines the difference between position R and position + from potentials d (V) and e (V) of the second output signal generated by the third and fourth MRE elements 47c and 47d and not from potentials c (V) and cl (V) of the first output signal generated by the first and second MRE elements 47a and 47b.

If the engine stops when the shift lever 15 is located at position R, the solenoid 31 is deactivated. This pivots the stopper plate 30, and the stopper plate 30 locks the shift lever 15.

The shift device 11 of the preferred embodiment has the advantages described below.

(1) The second pivot plate 49 is pivoted in cooperation with the shift lever 15 and the cooperative member 48 in the shift direction when the shift lever 15 is moved in the select direction. This enables the second pivot plate 49 to be arranged along the same plane as that of the first pivot plate 45, which also pivots in the shift direction in cooperation with the shift lever 15. More specifically, since the first pivot plate 45 and the second pivot plate 49 are arranged along the same plane, the space required to install the first sensor mechanism 43 and the second sensor mechanism 44 is small. This enables the manufacturing of a more compact shift device 11.

(2) The first sensor mechanism 43 and the second sensor mechanism 44 are arranged in one sensor unit 36 close to each other. Therefore, the first sensor mechanism 43 and the second sensor mechanism 44 so not have to be installed separately in the shift device 11. That is, since more than one sensor unit 36 is not required, the manufacturing cost of the shift device 11 is reduced. Further, the first sensor mechanism 43 and the second sensor mechanism 44 are installed or removed together by installing or removing the sensor unit 36. This facilitates the installation and removal of the first sensor mechanism 43 and the second sensor mechanism 44.

(3) The position of the shift lever 15 is detected from the result obtained by processing both first and second output signals with the AND circuit 71 and not from just one of the first and second output signals. That is, the correct position of the shift lever 15 is detected not only from the first output signal of the first and second MRE elements 47a and 47b but also from the second output signal of the third and fourth MRE elements 47c and 47d. This improves the accuracy for detecting the position of the shift lever 15.

(4) Since the first to fourth MRE elements 47a to 47d are non-contact sensors, which are arranged in the first sensor mechanism 43 and the second sensor mechanism 44, the first to fourth MRE elements 47a to 47d do not wear out. This improves the durability of the first sensor mechanism 43 and the second sensor mechanism 44 compared to when the first sensor mechanism 43 and the second sensor mechanism 44 are contact sensors.

(5) The first sensor mechanism 43 has the first and second MRE elements 47a and 47b, and the second sensor mechanism 44 has the third and fourth MRE elements 47c and 47d. Accordingly, the position of the shift lever 15 in the shift direction is detected even if the first MRE element 47a or the second MRE element 47b malfunctions. Further, the position of the shift lever 15 in the select direction is detected even if the third MRE element 47c or the fourth MRE element 47d malfunctions.

(6) The first to fourth MRE elements 47a to 47d are connected to the printed board 39 in the case 37. Therefore, the first to fourth MRE elements 47a to 47d may easily be wired to connectors that would be connected to the sides of the printed board 39. Further, the number of the first to fourth MRE elements 47a to 47d is small compared to when the first to fourth MRE elements 47a to 47d are provided for each position of the shift lever 15. This reduces the manufacturing cost of the shift device 11.

(7) Since the sensor unit 36 is arranged outside the housing 12, the maintenance and replacement of the sensor unit 36 are facilitated compared to when the sensor unit 36 is arranged in the housing 12.

It should be apparent to those skilled in the art that the present invention may be embodied in many other specific forms without departing from the spirit or scope of the invention. Particularly, it should be understood that the present invention may be embodied in the following forms.

The first pivot plate 45 and the second pivot plate 49 do not have to be arranged on the same plane.

Hall elements, for example, may be used in lieu of the first to fourth MRE elements 47a to 47d as the first and second sensors. Alternatively, the first and second sensor mechanisms 43 and 44 may be contact sensors.

One of the first and second MRE elements 47a and 47b may be eliminated. Alternatively, a further MRE element may be added. In the same manner, one of the third and fourth MRE elements 47c and 47d, which detect the magnetic flux of the magnet 50, may be eliminated. Alternatively, a further MRE element may be added.

In addition to attaching the magnet 46 to the printed board 39, the first and second MRE elements 47a and 47b may be attached to the first pivot plate 45. Further, in addition to the attaching the magnet 50 to the printed board 39, the second pivot plate 49 and the third and fourth MRE elements 47c and 47d may be attached to the second pivot plate 49.

The direction in which the shift lever 15 moves between positions R, N, +, and − may be the second direction, and the direction in which the shift lever 15 moves between positions N and S/A, that is, the select direction, may be the first direction.

The shift lever 15 may be locked at any position other the position R, such as position S.

The shift gate 13 may have any shape.

The sensor unit 36 may be arranged inside the housing 12.

The shift device 11 does not have to be arranged on the floor console F and may be arranged, for example, on an instrument panel or a column, which includes a steering shaft.

The present examples and embodiments are to be considered as illustrative and not restrictive, and the invention is not to be limited to the details given herein, but may be modified within the scope and equivalence of the appended claims.

What is claimed is:

1. A shift device for shifting gears of a vehicle transmission, the shift device comprising:
    a shift lever movable in a first direction and a second direction to shift the gears of the transmission, wherein the first direction is perpendicular to the second direction;
    a first movable member connected to the shift lever to move in cooperation with the shift lever for detecting the position of the shift lever in the first direction;
    a second movable member connected to the shift lever to move in cooperation with the shift lever for detecting the position of the shift lever in the second direction, wherein the first and second movable members pivot along the same plane;
    a first sensor mechanism including the first movable member;
    a second sensor mechanism including the second movable member;
    a sensor unit retaining the first and second sensor mechanisms;
    a first sensor arranged in the first sensor mechanism to generate a first detection signal corresponding to the position of the first movable member;
    a second sensor arranged in the second sensor mechanism to generate a second detection signal corresponding to the position of the second movable member; and
    an operation circuit connected to the first and second sensors to determining the position of the shift lever with the first and second detection signals.

2. The shift device according to claim 1, wherein the first and the second sensors are each non-contact sensors.

3. The shift device according to claim 1, further comprising:
    a first magnet attached to the first movable member; and
    a second magnet attached to the second movable member, wherein the first sensor includes a plurality of MRE elements for detecting magnetic force of the first magnet, and the second sensor includes a plurality of MRE elements for detecting magnetic force of the second magnet.

4. A shift device for shifting gears of a vehicle transmission, the shift device comprising:
    a shaft lever movable in a first direction and a second direction to shift the gears of the transmission, wherein the first direction is perpendicular to the second direction;
    a first movable member connected to the shift lever to move in cooperation with the shift lever for detecting the position of the shift lever in the first direction;
    a second movable member connected to the shift lever to move in cooperation with the shift lever for detecting the position of the shift lever in the second direction, wherein the first and second movable members pivot along the same plane;
    a first sensor mechanism including the first movable member;
    a second sensor mechanism including the second movable member,
    a sensor unit retaining the first and second sensor mechanisms;
    a first sensor arranged in the first sensor mechanism to generate a first detection signal corresponding to the position of the first movable member;
    a second sensor arranged in the second sensor mechanism to generate a second detection signal corresponding to the position of the second movable member; and
    an operation circuit connected to the first and second sensors to determining the position of the shift lever with the first and second detection signals.

5. The shift device according to claim 4, further comprising:
    a first magnet attached to the first movable member; and
    a second magnet attached to the second movable member, wherein the first sensor includes a plurality of MRE elements for detecting magnetic force of the first magnet, and the second sensor includes a plurality of MRE elements for detecting magnetic force of the second magnet.

* * * * *